United States Patent
Grice et al.

(10) Patent No.: US 9,800,469 B2
(45) Date of Patent: *Oct. 24, 2017

(54) PREDICTING THE PERFORMANCE OF A MULTI-STAGE COMMUNICATIONS NETWORK UNDER LOAD FROM MULTIPLE COMMUNICATING SERVERS

(71) Applicant: INTERNATIONAL BUSINESS MACHINES CORPORATION, Armonk, NY (US)

(72) Inventors: Donald G. Grice, New Paltz, NY (US); William A. Hanson, Gaithersburg, MD (US); John Lewars, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 399 days.

This patent is subject to a terminal disclaimer.

(21) Appl. No.: 13/857,204

(22) Filed: Apr. 5, 2013

(65) Prior Publication Data

US 2014/0304392 A1    Oct. 9, 2014

(51) Int. Cl.
| | |
|---|---|
| G06F 15/173 | (2006.01) |
| H04L 12/24 | (2006.01) |
| H04L 12/751 | (2013.01) |
| H04L 12/28 | (2006.01) |

(52) U.S. Cl.
CPC .......... H04L 41/12 (2013.01); H04L 41/145 (2013.01); H04L 41/147 (2013.01); H04L 12/28 (2013.01); H04L 45/02 (2013.01)

(58) Field of Classification Search
CPC .......... H04L 12/28; H04L 45/02; G06F 19/00
USPC ........................................ 709/220, 221, 224
See application file for complete search history.

(56) References Cited

U.S. PATENT DOCUMENTS

| | | | |
|---|---|---|---|
| 6,819,654 B2* | 11/2004 | Soloway et al. | 370/238 |
| 2004/0257989 A1* | 12/2004 | Lingafelt et al. | 370/230 |
| 2009/0268756 A1* | 10/2009 | Frantz | 370/468 |
| 2010/0061264 A1* | 3/2010 | Campbell et al. | 370/253 |
| 2014/0269328 A1* | 9/2014 | Venkataswami et al. | 370/238 |

OTHER PUBLICATIONS

"z/Architecture Principles of Operation," IBM® Publication No. SA22-7832-09, Tenth Edition, Sep. 2012, pp. 1-1568.

(Continued)

*Primary Examiner* — Wing F Chan
*Assistant Examiner* — Joseph Maniwang
(74) *Attorney, Agent, or Firm* — Heslin Rothenberg Farley & Mesiti P.C.

(57) ABSTRACT

A capability is provided for predicting the performance of a communications network, such as a multi-stage communications network. The predicted performance includes, in one aspect, predicting the amount of bandwidth that a server of the communications network could deliver with a full load on the network. In one aspect, the predictive capability includes determining an aggregate load for each server of the network being analyzed; performing normalization on the loads of the links used by the servers to obtain updated link and/or server bandwidths; and determining for each server, a minimum bandwidth over the links in the server's route.

18 Claims, 10 Drawing Sheets

(56) References Cited

OTHER PUBLICATIONS

"Power ISA™ Version 2.06 Revision B," International Business Machines Corporation, Jul. 23, 2010, pp. 1-1341.
"Intel® 64 and IA-32 Architectures Developer's Manual: vol. 2A, Instructions Set Reference, A-L," Order No. 253666-045US, Jan. 2013, pp. 1-524.
"Intel® 64 and IA-32 Architectures Developer's Manual: vol. 2B, Instructions Set Reference, M-Z," Order No. 253667-045US, Jan. 2013, pp. 1-550.

* cited by examiner

Server 0: C1 – C7 – C11
Server 1: C2 – C7 – C12
Server 2: C3 – C8 – C13
Server 3: C4 – C8 – C14
Server 4: C5 – C9 – C11
Server 5: C6 – C10 – C15

Server 0: C1(1) - C7(2) - C11(2) = 1/4
Server 1: C2(1) – C7(2) – C12(1) = 1/2
Server 2: C3(1) – C8(2) – C13(1) = 1/2
Server 3: C4(1) – C8(2) – C14(1) = 1/2
Server 4: C5(1) – C9(1) – C11(2) = 1/2
Server 5: C6(1) – C10(1) – C15(1) = 1

Server 0: C1(.25) – C7(.75) – C11(.75)
Server 1: C2(.5) – C7(.75) – C12(.5)
Server 2: C3(.5) – C8(1) – C13(.5)
Server 3: C4(.5) – C8(1) – C14(.5)
Server 4: C5(.5) – C9(.5) – C11(.75)
Server 5: C6(1) – C10(1) – C15(1)

Server 0: C1(.25x4=1) – C7(.25x1.33=.33) – C11(.25x1.33=.33)
Server 1: C2(.5x2=1) – C7(.5x1.33=.67) – C12(.5x2=1)
Server 2: C3(.5x2=1) – C8(.5x1=.5) – C13(.5x2=1)
Server 3: C4(.5x2=1) – C8(.5x1=.5) – C14(.5x2=1)
Server 4: C5(.5x2=1) – C9(.5x2=1) – C11(.5x1.33=.67)
Server 5: C6(1x1=1) – C10(1x1=1) – C15(1x1=1)

FIG. 9

Server 0: .33
Server 1: .67
Server 2: .5
Server 3: .5
Server 4: .67
Server 5: 1

PREDICTING THE PERFORMANCE OF A MULTI-STAGE COMMUNICATIONS NETWORK UNDER LOAD FROM MULTIPLE COMMUNICATING SERVERS

BACKGROUND

One or more aspects relate, in general, to communications networks, and in particular, to the performance of such networks.

In one example, a communications network has multiple pairs of servers communicating simultaneously. The communicating includes sending and receiving messages between the communications servers. Such a communications network provides a number of simultaneous communications paths, and one or more of the paths typically has multiple communications stages, thereby providing a multi-stage communications network (a.k.a., a multi-stage network). In general, a multi-stage network includes a number of stages, each consisting of a set of switching elements.

In a multi-stage network where there are shared resources, it is difficult to provide a design that has a correct network topology and interconnections, and to provide routing information to the switches in the system to be able to communicate messages from one server to the other. When a communications network is simultaneously used by multiple communicating servers, there is often interference in the network resources among the messages sent and received between the communicating servers. This interference results in lower performance than if the servers were communicating alone on the network.

In an attempt to obtain the best performance from the resulting system, it is possible to vary both the network configuration and the routing techniques. It is a standard practice to make educated guesses as to the best topologies and routing techniques, and then, to validate the performance after the system is actually constructed and running.

BRIEF SUMMARY

Shortcomings of the prior art are overcome and additional advantages are provided through the provision of a computer program product for predicting the performance of a server of a communications network. The computer program product comprises a storage medium readable by a processing circuit and storing instructions for execution by the processing circuit for performing a method. The method includes, for instance, determining an aggregate communications load for the server of the communications network, wherein the aggregate communications load is based on a plurality of link loads for a plurality of links to be used by the server; based on the aggregate communications load, normalizing the plurality of link loads to obtain a plurality of normalized link loads; and using the plurality of normalized link loads, determining a server bandwidth for the server, the server bandwidth providing an indication of the performance of the server.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 6 depicts one example of server route loading information for the network configuration of FIG. 3, including cable offered loads;

FIG. 7A depicts one example of updated cable offered loads;

FIG. 7B depicts one example of updated server offered loads;

FIG. 8 depicts one example of normalized cable load factors;

FIG. 9 depicts one example of updated server bandwidth information;

FIG. 10 depicts one example of minimum bandwidths for each server of the network configuration of FIG. 3;

FIG. 11 depicts one example of final cable loading after normalization;

DETAILED DESCRIPTION

In one aspect, a capability is provided for predicting the performance of a communications network, such as a multi-stage communications network. The predicted performance includes, for instance, predicting the amount of bandwidth that a server of the communications network could deliver with a full load on the network. As one example, the predicted bandwidth amount is the minimum projected bandwidth over all the links in a server's route, which is taken as the final offered load of the server. The predictive capability includes, for instance, determining aggregate loading for each server of the network being analyzed; performing normalization on the loads of the links used by the servers to obtain updated link and/or server bandwidths; and determining for each server, a minimum bandwidth over all links in the server's route.

In one or more embodiments, topology information assumed in the network to be evaluated and routing information for that topology produced by, for instance, routing software, is used, along with a specified set of communicating servers in the system to predict the amount of bandwidth each of those servers may see, as well as the total amount of bandwidth seen by them all, when they all try to communicate at once. The results provided in one embodiment by one or more aspects of the predictive capability allow both topology changes and route generation techniques to be evaluated without requiring the actual network to be used for the experiments.

The use of the network by a large number of pairs of servers at the same time is typical of parallel computing techniques. It is the synchronized use of the network by all or many of the servers that causes interference patterns, and the resulting degradation of the communication degrades the performance of the entire parallel application. The ability to predict this system-wide interference behavior with varying input loading, routing choices, and topology options, allows optimizations to be investigated prior to building the actual system. It also allows the investigation of changes to routing and server scheduling techniques without needing to use the resources of the system under evaluation.

Figure 1:
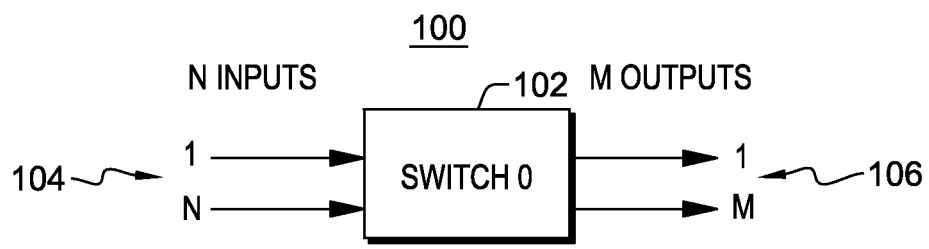
FIG. 1 depicts one example of a switch unit.

In one embodiment, a multi-stage communications network is constructed using multiple interconnected switch units. As shown in FIG. 1, a switch unit 100 includes a switch chip 102 with N inputs 104 and M outputs 106. In one example, the number of inputs is equal to the number of outputs, but this is not required.

Figure 2:
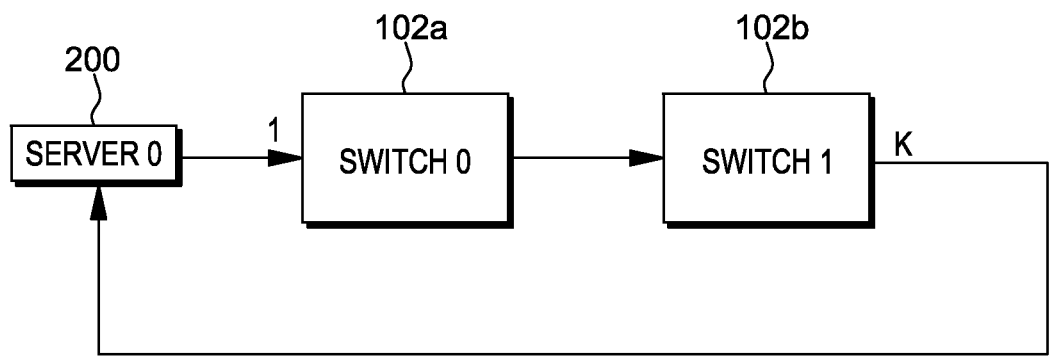
FIG. 2 depicts one example of a server connection.

As shown in FIG. 2, a server 200 is connected to the input of one switch chip 102a and the output of another switch chip 102b. Although it is shown in this figure that server 200 is connected to the input of one switch chip, but the output of another switch chip, in a further embodiment, the server may be connected to the input and output of the same switch chip.

Figure 3:
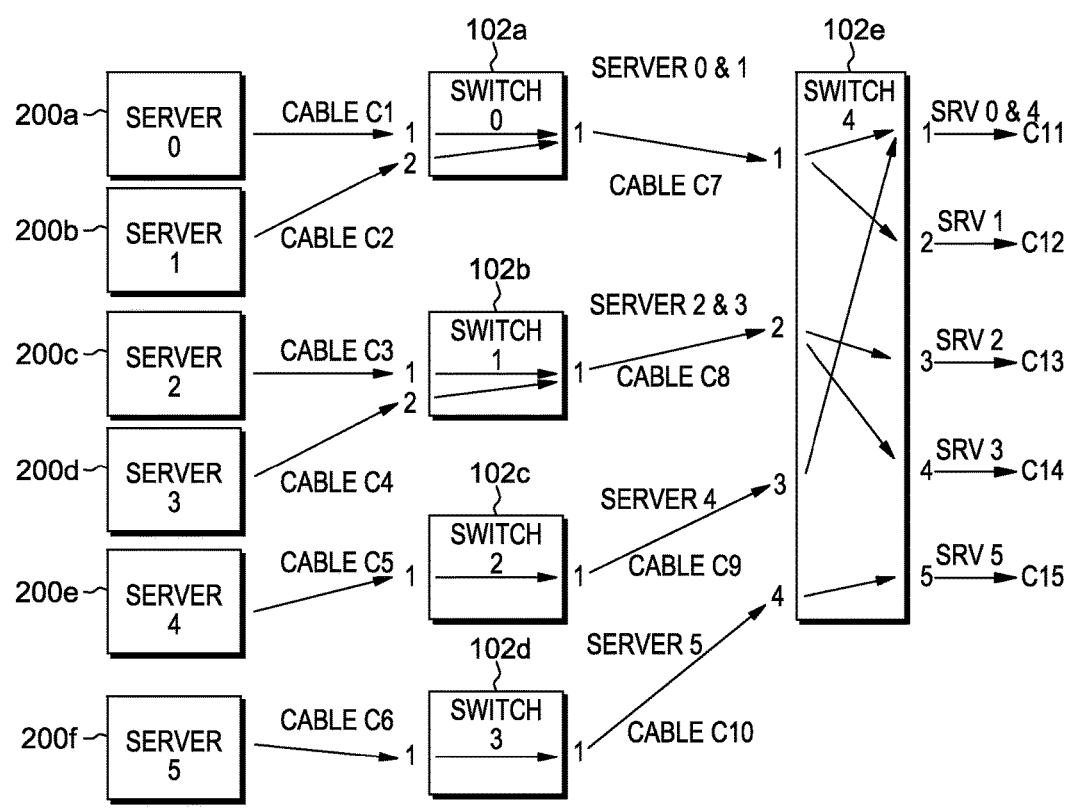
FIG. 3 depicts one example of a multi-stage network configuration.

One embodiment of a multi-stage communications network is depicted in FIG. 3. As shown, two servers, Server 0 (200a) and Server 1 (200b), are connected to a switch, Switch 0 (102a), via two links, such as cables C1, C2, respectively; and two other servers, Server 2 (200c) and Server 3 (200d), are connected to a switch, Switch 1 (102b), via links, such as cable C3 and cable C4, respectively. Further, a fifth server, Server 4 (200e), is connected to a switch, Switch 2 (102c), via a link, such as cable C5, and another server, Server 5 (200f), is connected to a switch, Switch 3 (102d), via a link, such as cable C6. Switches 102a-102d are then connected to a switch, Switch 4 (102e), via a plurality of links, such as cables C7-C10. In particular, in this example, Switch 0 is connected to Switch 4 via cable C7; Switch 1 is connected to Switch 4 via cable C8; Switch 2 is connected to Switch 4 via cable C9; and Switch 3 is connected to Switch 4 via cable C10.

Figures 4, 5A:
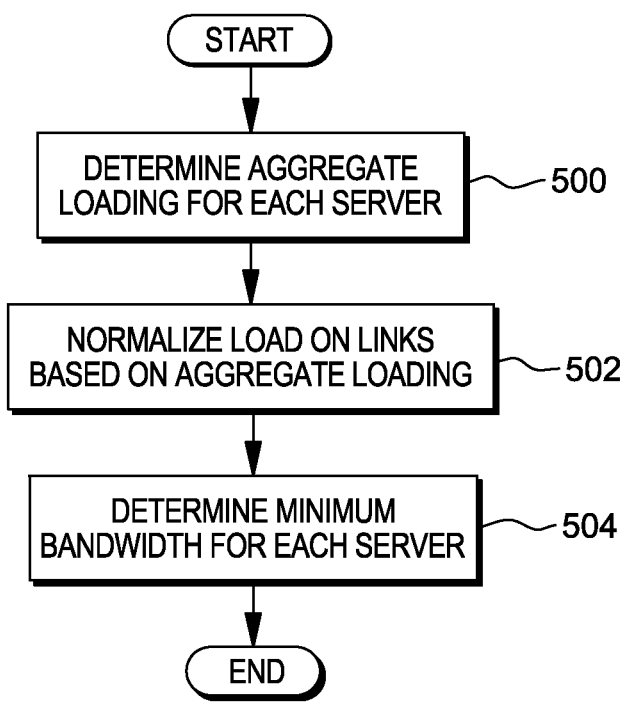
FIG. 4 depicts one example of routing information for the multi-stage network configuration of FIG. 3.
FIG. 5A depicts one embodiment of an overview of the logic to determine bandwidth in accordance with one or more aspects.

As one example, the messages from Server 0 and Server 4 exit Switch 4 at output 1 via cable C11; messages from Server 1 exit Switch 4 at output 2 via cable C12; messages from Server 2 exit Switch 4 at output 3 via cable C13; messages from Server 3 exit Switch 4 at output 4 via cable C14; and messages from Server 5 exit Switch 4 at output 5 via cable C15. The cable routes to accomplish this are shown in FIG. 4. Although cables are described in the examples herein, other types of links may be used.

Referring to FIG. 4, in one example, the routing information for Server 0 is cable C1 to cable C7 to cable C11; for Server 1 is cable C2 to cable C7 to cable C12; for Server 2, is cable C3 to cable C8 to cable C13; for Server 3 is cable C4 to cable C8 to cable C14; for Server 4 is cable C5 to cable C9 to cable C11; and for Server 5 is cable C6 to cable C10 to cable C15.

Examining the routes used by Server 0, for instance, it can be seen that Server 0 shares cable C7 with Server 1 and cable C11 in the next stage with Server 4. Thus, one goal is to determine the amount of bandwidth that each of the servers will actually receive if they all (or many of them) use the network at the same time.

Figure 5B:
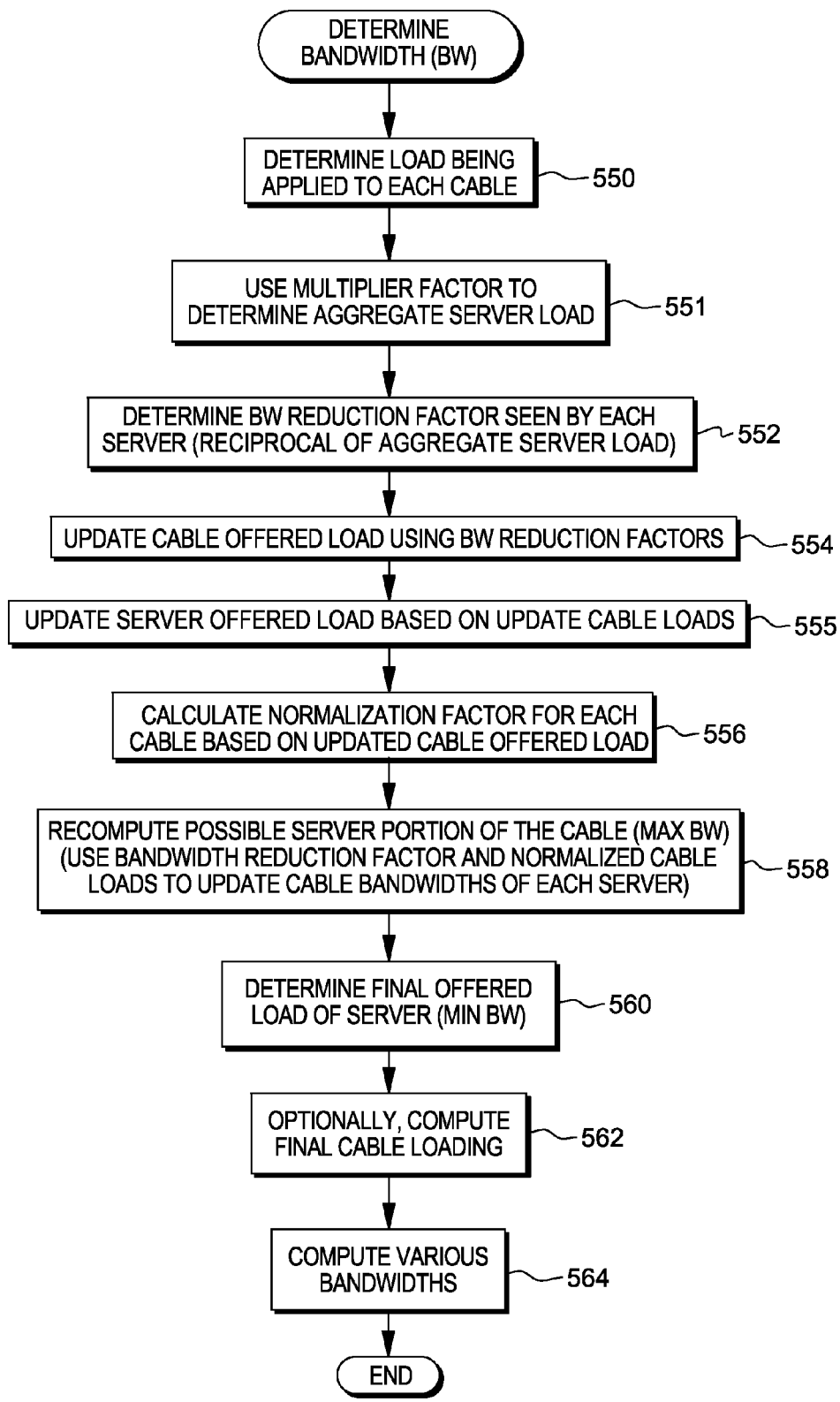
FIG. 5B depicts one embodiment of further details of the logic to determine bandwidth in accordance with one or more aspects.

One embodiment of the logic used in determining this goal is described with reference to FIGS. 5A-5B. FIG. 5A provides an overview of a technique for determining minimum bandwidth for each server (i.e., the amount of bandwidth that a server will receive with full load over the network), while FIG. 5B provides additional details regarding one embodiment of the technique. This logic is performed, in one example, by a processor separate from the network, but in another embodiment, is performed by a server of the network.

Referring initially to FIG. 5A, to determine the amount of bandwidth a server may receive with simultaneous communication between the servers of a particular network topology, a determination is first made of the aggregate load for each server, STEP 500. Then, based on the aggregate load, a normalization factor is computed for each link and applied to the servers, STEP 502. Thereafter, the minimum bandwidth for each server is determined using the normalized factors, STEP 504. The minimum bandwidth is the smallest bandwidth selected from the bandwidths of the routes for each server. By using the minimum bandwidth, it is guaranteed that the server will receive at least that bandwidth during network communications. Further details of each of these steps is described with reference to FIG. 5B.

Referring to FIG. 5B, in one example to determine the aggregate load, STEPs 550-551 are performed. Initially, the load being applied to each cable is determined, STEP 550. In one example, to make this determination, it is assumed that all of the cables have the same bandwidth capability and that it is equal to the load that a server can apply to the network. Scanning through the routes in this example, it is determined that all of the cables have an offered load of 1 except for cable C7, cable C8 and cable C11, which have an offered load of 2, as depicted in the parentheses of FIG. 6. That is, each of the cables is in one server route, except for cables C7, C8 and C11, which are in two server routes (e.g., cable C7 is included in routes for Server 0 and Server 1; cable C8 is included in routes for Server 2 and Server 3; and cable C11 is included in routes for Server 0 and Server 4).

Thereafter, a multiplier factor is used with the loads being applied to determine the aggregate server load, STEP 551. For instance, for Server 0, the product of the loads of the route for Server 0 is 4 ($1 \times 2 \times 2 = 4$), and thus, the aggregate server load for Server 0 is 4. This is depicted in the denominator of the fraction shown in FIG. 6 after the equal sign. Similarly, for Server 1, the product of the loads is 2 ($1 \times 2 \times 1 = 2$), and thus, the aggregate server load for Server 1 is 2; for Server 2, the aggregate load is 2 ($1 \times 2 \times 1 = 2$); for Server 3, the aggregate load is 2 ($1 \times 2 \times 1 = 2$); for Server 4, the aggregate load is 2 ($1 \times 1 \times 2 = 2$); and for Server 5, the aggregate load is 1 ($1 \times 1 \times 1 = 1$).

Subsequently, based on the aggregate server loads, a bandwidth (BW) reduction factor seen by each server is determined, STEP 552. In one example, this is the reciprocal of the product of the loading factor seen on each of the cables that is included in a server's route, as shown in FIG. 6. For instance, for Server 0, the product of the loading of the routing information is 4 ($1 \times 2 \times 2 = 4$), and the reciprocal is ¼. Thus, the bandwidth reduction factor is 0.25. Similarly, for Server 1, the product of the loading is 2 (1×2×1=2), and the reciprocal is ½, providing a bandwidth reduction factor of 0.5, and so forth.

With the new effective server offered loads, each cable offered load is updated, STEP 554. For example, as depicted in FIG. 7A, C1 is 0.25, since C1 is a cable of Server 0 and the calculated bandwidth reduction factor for Server 0 is 0.25. Further, C2 is 0.5, since C2 is part of the route for Server 1 and its bandwidth reduction factor is 0.5. Similarly, the updated cable offered load for C3 is 0.5, for C4 is 0.5, C5 is 0.5, C6 is 1, C9 is 0.5, C10 is 1, C12 is 0.5, C13 is 0.5, C14 is 0.5 and C15 is 1. The updated load for C7 is 0.75, since C7 is part of two routes: route for Server 0 having a bandwidth reduction factor of 0.25 and a route for Server 1 having a bandwidth reduction factor of 0.5; thus, 0.25+0.5=0.75 for cable C7. Similarly, cable C8 has a load of 1 (0.5+0.5=1), and cable C11 has a load of 0.75 (0.25+0.5=0.75).

Returning to FIG. 5B, using the updated cable loading information, the server offered loads are updated, in one embodiment, STEP 555. For instance, as shown in FIG. 7B, for Server 0, the updated server offered load is C1 (0.25)–C7 (0.75)–C11 (0.75); for Server 1, it is C2 (0.5)–C7 (0.75)–C12 (0.5); and so forth. (In another embodiment, this STEP is not performed at this time.)

Further, with the updated cable loading, the load on the links is normalized, STEP 556 (FIG. 5B), which is also indicated in STEP 502 (FIG. 5A). For instance, to normalize the load, the reciprocal is taken of the values obtained for the updated cable loading information depicted in FIG. 7A. Thus, for cable C1, the normalized cable loading factor is 4 (1/0.25). Similarly, for cable C2, the normalization factor is 2 (1/0.5), and so forth.

Using the normalized cable loading factors, updated server bandwidth information is provided, STEP 558 (FIG. 5B). In one example, as shown in FIG. 9, to obtain the updated server bandwidth, the maximum bandwidth for each cable of the route is determined by multiplying the bandwidth reduction factor of FIG. 6 with the normalized factor of FIG. 8. For instance, for Server 0: C1 (0.25×4=1)–C7 (0.25×1.33=0.33)–C11 (0.25×1.33=0.33), and so forth. This is a maximum bandwidth that the server could see on that cable if it were the most restrictive. Since the server can only deliver the amount of bandwidth its most restrictive cable will allow, a determination is made as to the minimum bandwidth over all cables in a server's route, and that is taken as the final offered load of the server, STEP 560 (FIG. 5B), which is also indicated in STEP 504 of FIG. 5A. Thus, as shown in FIG. 10, the minimum bandwidth for Server 0 is 0.33, since this is the minimum of Server 0's routes (C1=1, C7=0.33, C11=0.33), as shown in FIG. 9. Similarly, the minimum bandwidth for Server 1 is 0.67; for Server 2 is 0.5; for Server 3 is 0.5; for Server 4 is 0.67; and for Server 5 is 1.

These numbers can then be used to compute each final cable loading, STEP 562 (FIG. 5B), as shown in FIG. 11, if that information is needed or desired. For instance, the final cable loading for C1 is 0.33, since C1 is part of the route for Server 0 and the minimum bandwidth for Server 0 is 0.33. Likewise, the final cable loading for C2 is 0.67, since C2 is part of the route for Server 1 and the minimum bandwidth for Server 1 is 0.67. Further, the final cable loading for C3 is 0.5; for C4 is 0.5; for C5 is 0.67; for C6 is 1; for C7 is 1 (0.33 for Server 0+0.67 for Server 1); for C8 is 1 (0.5 for Server 2+0.5 for Server 3); for C9 is 0.67; for C10 is 1; for C11 is 1 (0.33 for Server 0+0.67 for Server 4); for C12 is 0.67; for C13 is 0.5; for C14 is 0.5; and for C15 is 1.

These final server bandwidths can then be used to compute individual communication bandwidths, aggregate delivered bandwidth by the network, and compute any other statistics (e.g., maximum, minimum, standard deviation, average, totals) that are needed or desired, STEP 564 (FIG. 5B). In one example, the final server bandwidths (e.g., FIG. 10) can be compared to final server bandwidths of other routing configurations that are analyzed to determine, for instance, an optimal routing configuration. In a further example, the final server bandwidths may be added together to provide a total aggregate bandwidth for the communications network. Other uses and/or examples are also possible.

As described herein, the predictive capability includes performing normalization, which is described above. However, an overview of one embodiment of the logic used to normalize link loads is also described below with reference to FIG. 5C.

Figure 5C:
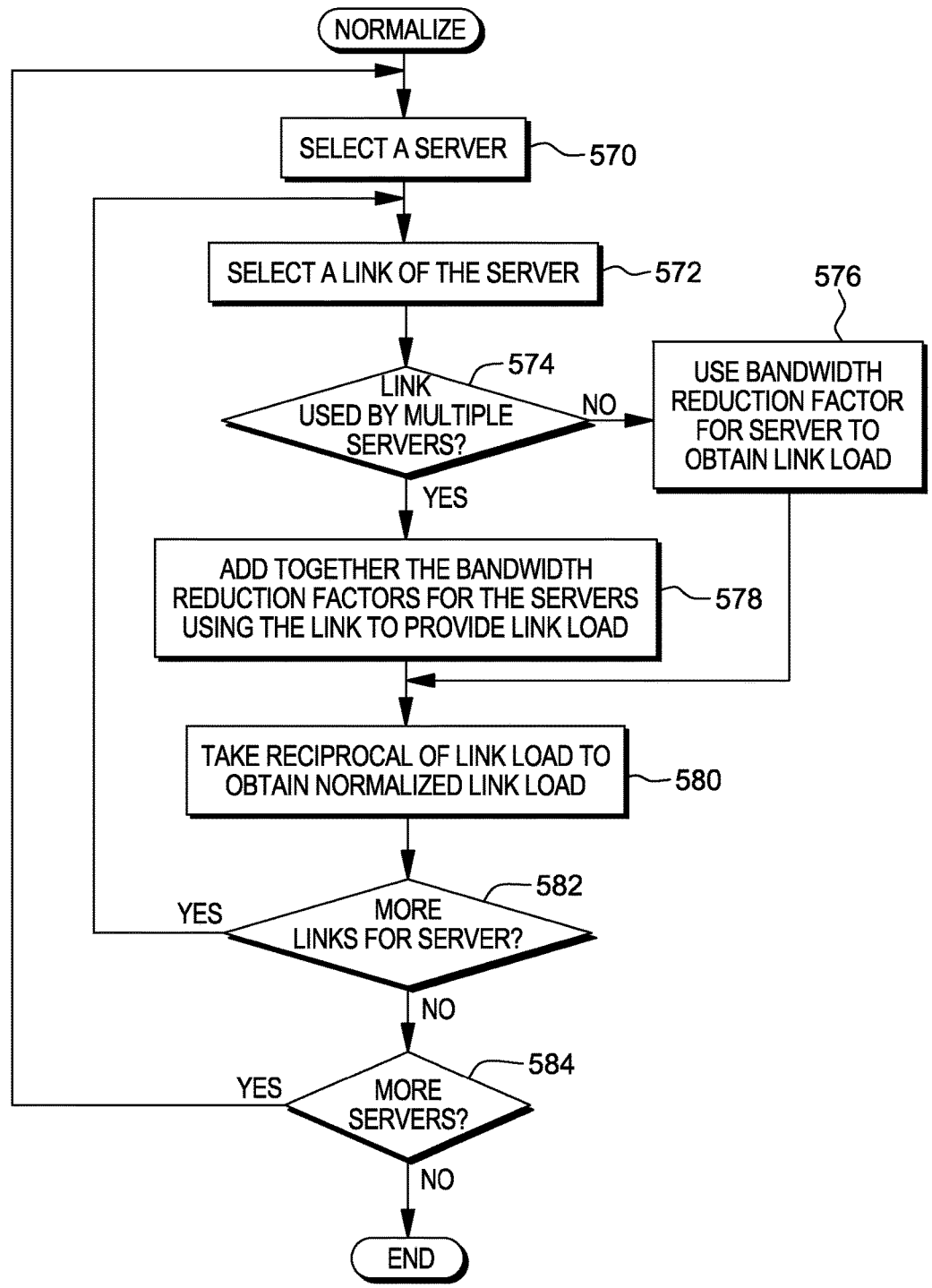
FIG. 5C depicts one embodiment of an overview of the logic to normalize link loads.

Referring to FIG. 5C, initially, a server of the network being analyzed is selected, STEP 570. Then, a link of the server to be used in routing is also selected, STEP 572. Thereafter, a determination is made as to whether the link is to be used by multiple servers, INQUIRY 574. If it is not to be used by multiple servers, then the bandwidth reduction factor determined for the server is to be used as the link load for the link, STEP 576. Otherwise, if the link is to be used by multiple servers, then the bandwidth reduction factors for the servers that are to use the link are added together to provide the link load, STEP 578.

Subsequently, the reciprocal of the link load is taken (i.e., 1/link load) to obtain the normalized link load, STEP 580. Then, a determination is made as to whether there are more links for the server, INQUIRY 582. If so, processing continues with STEP 572. Otherwise, processing continues to INQUIRY 584 in which a determination is made as to whether there are more servers of the network. If there are more servers, then processing continues to STEP 570. Otherwise, the normalizing processing is complete.

In the above description, uniform cable bandwidth characteristics and a server offered load equal to the cable bandwidth are assumed, as well as a steady state load offered by the servers. However, in further embodiments, these assumptions can be different, as described below with reference to the following extensions:

Extension 1

It is possible that the servers do not deliver as much offered load as the cables in the network can handle. In this case, the initial cable loading factor would be less than one, and the rest of the computation would be the same.

Extension 2

Multiple routes are used by the server during the course of this communication pattern. Quite often the communications network and the route techniques allow for the message being sent by the server to use more than one active route, in order to achieve better load balancing.

This can easily be accommodated, in one or more aspects, by associating more than one route with a given server and summing the resulting bandwidths (or taking the minimum depending on the architecture of the messaging system). If the load is split evenly over the routes, then 1/N would be the offered load for each route in the analysis, where N is the number of parallel routes being used by the server. The interference caused by the multiple routes with others in the system is automatically accounted for, in one or more aspects.

Extension 3

It is possible that the communications network does not have uniformly performing cables. This case can be accommodated, in one or more aspects, by multiplying the initially offered load of the link being examined (e.g., in STEP 551 of FIG. 5B, and pictorially in FIG. 6) by the ratio of the fastest link in the system. For example, if a cable had the capability of only ½ the fastest cable, then each server would initially be providing an offered load of 2 instead of 1. The rest of the technique would be the same. The bandwidth normalization step would be normalizing to the capability of the actual link rather than 1 (e.g., ½ in this example).

Extension 4

The original use case described was for a steady state offered load from all of the servers. There are use cases where the servers each offer a fixed amount of data to be transferred during the experiment. In that case, the faster servers will complete their transmissions first and remove their offered load from the network. To account for this in the analysis, after the first iteration of the technique is completed, the fastest nodes could be removed from the server input list and the analysis could be repeated with a subset of the servers. This will result in the remaining nodes possibly having more bandwidth than the original interference pattern allowed. To compute the effective bandwidth of these remaining nodes, a weighted average of the initial bandwidths is used, and the bandwidths that result from the iterations of analysis as servers are removed. Depending on the accuracy of the analysis for this case, wider or smaller windows of server performance can be removed from the experiment. Larger granularity in the groups being removed will save computation time, but will provide less resolution and accuracy for the slowest nodes in the experiment.

Other extensions and/or variations are also possible.

As indicated above, in one example, a processor apart from the network is used to execute the predictive bandwidth logic. One embodiment of such a processor is described with reference to FIGS. 12A-12B, in which FIG. 12A depicts one embodiment of a computing environment to incorporate and use one or more aspects of the predictive bandwidth technique, and FIG. 12B depicts further details of the processor of FIG. 12A.

Figure 12A:
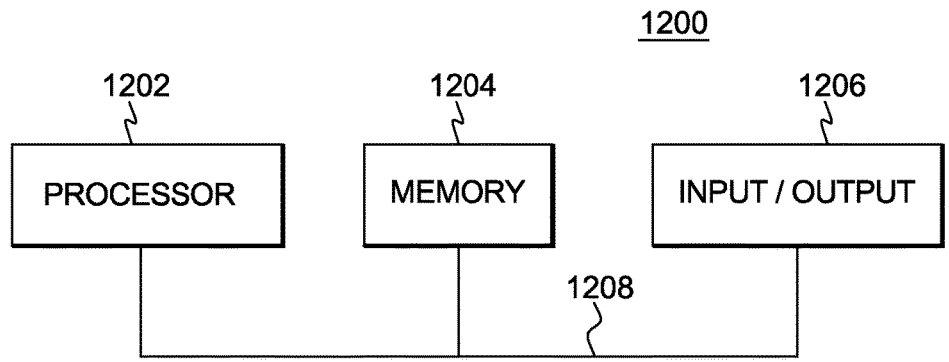
FIG. 12A depicts one example of a computing environment to incorporate and use one or more aspects.
Figure 12B:
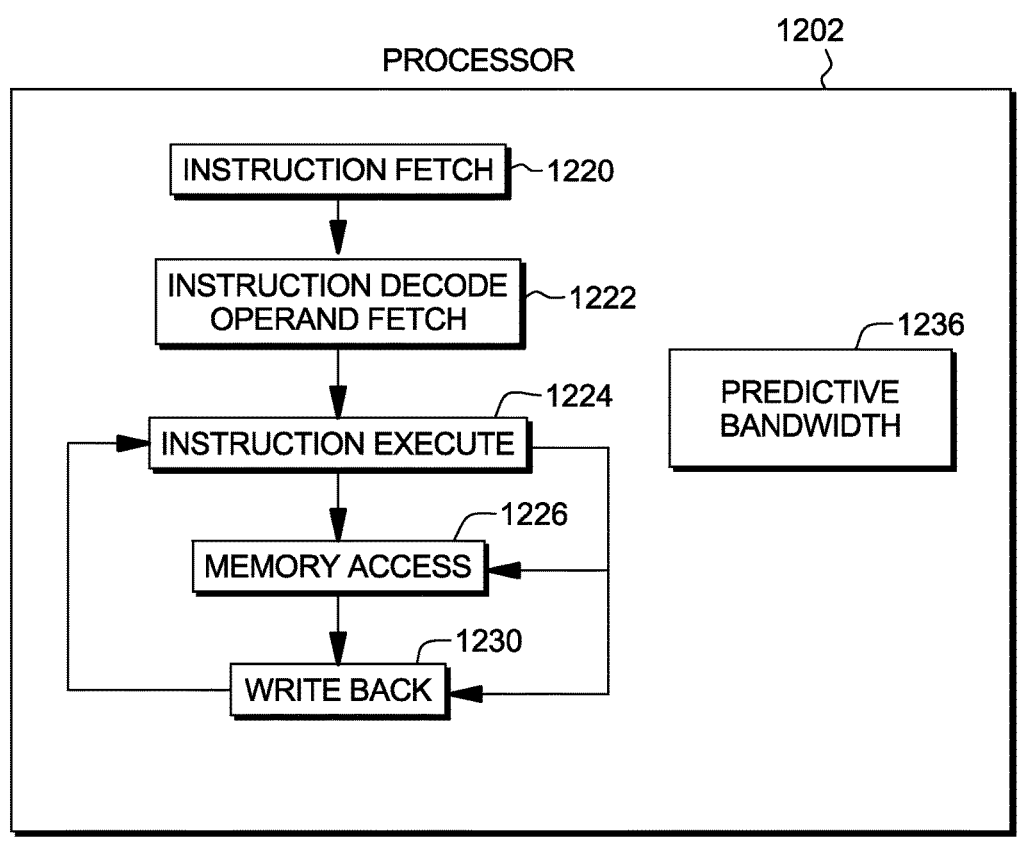
FIG. 12B depicts further details of the processor of FIG. 12A.

Referring initially to FIG. 12A, a computing environment 1200 includes, for instance, a processor 1202 (e.g., a central processing unit), a memory 1204 (e.g., main memory), and one or more input/output (I/O) devices and/or interfaces 1206 coupled to one another via, for example, one or more buses 1208 and/or other connections.

In one example, processor 1202 is based on the z/Architecture offered by International Business Machines Corporation, and is part of a server, such as the System z server, which implements the z/Architecture and is also offered by International Business Machines Corporation. One embodiment of the z/Architecture is described in an IBM® publication entitled, "z/Architecture Principles of Operation," IBM® Publication No. SA22-7832-09, Tenth Edition, September, 2012, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation, Armonk, N.Y., USA. Other names used herein may be registered trademarks, trademarks, or product names of International Business Machines Corporation or other companies.

In a further embodiment, processor 1202 is based on the POWER ARCHITECTURE offered by International Business Machines Corporation. One embodiment of the POWER ARCHITECTURE is described in "Power ISA™ Version 2.06 Revision B," International Business Machines Corporation, Jul. 23, 2010, which is hereby incorporated herein by reference in its entirety. POWER ARCHITECTURE® is a registered trademark of International Business Machines Corporation.

In yet a further embodiment, processor 1202 is based on an INTEL architecture offered by Intel Corporation. One embodiment of the Intel architecture is described in "Intel® 64 and IA-32 Architectures Developer's Manual: Vol. 2A, Instructions Set Reference, A-L," Order Number 253666-045US, January 2013, and "Intel® 64 and IA-32 Architectures Developer's Manual: Vol. 2B, Instructions Set Reference, M-Z," Order Number 253667-045US, January 2013, each of which is hereby incorporated herein by reference in its entirety. INTEL® is a registered trademark of Intel Corporation, Santa Clara, Calif.

Processor 1202 includes a plurality of functional components used to execute instructions. As depicted in FIG. 12B, these functional components include, for instance, an instruction fetch component 1220 to fetch instructions to be executed; an instruction decode unit 1222 to decode the fetched instructions and to obtain operands of the decoded instructions; an instruction execute component 1224 to execute the decoded instructions; a memory access component 1226 to access memory for instruction execution, if necessary; and a write back component 1230 to provide the results of the executed instructions. One or more of these components may, in accordance with an aspect, provide predictive bandwidth functionality by including at least a portion of or having access to a predictive bandwidth component 1236.

Figure 13A:
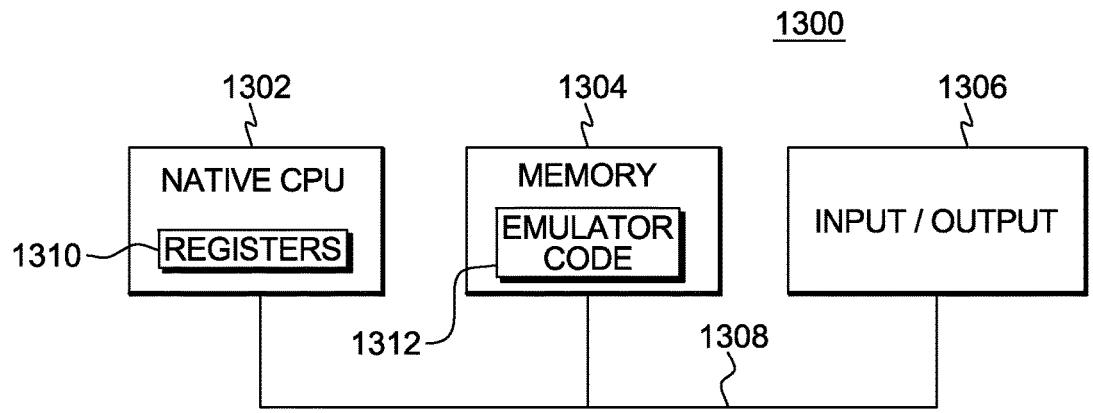
FIG. 13A depicts another example of a computing environment to incorporate and use one or more aspects.

Another embodiment of a computing environment to incorporate and use one or more aspects is described with reference to FIG. 13A. In this example, a computing environment 1300 includes, for instance, a native central processing unit 1302, a memory 1304, and one or more input/output devices and/or interfaces 1306 coupled to one another via, for example, one or more buses 1308 and/or other connections. As examples, computing environment 1300 may include a POWERPC processor, a pSeries server or an xSeries server offered by International Business Machines Corporation, Armonk, N.Y.; an HP Superdome with INTEL Itanium II processors offered by Hewlett Packard Co., Palo Alto, Calif.; and/or other machines based on architectures offered by International Business Machines Corporation, Hewlett Packard, Intel, Oracle, or others.

Native central processing unit 1302 includes one or more native registers 1310, such as one or more general purpose registers and/or one or more special purpose registers used during processing within the environment. These registers include information that represents the state of the environment at any particular point in time.

Moreover, native central processing unit 1302 executes instructions and code that are stored in memory 1304. In one particular example, the central processing unit executes emulator code 1312 stored in memory 1304. This code enables the processing environment configured in one architecture to emulate another architecture. For instance, emulator code 1312 allows machines based on architectures other than the Z/ARCHITECTURE, such as POWERPC processors, pSeries servers, xSeries servers, HP Superdome servers or others, to emulate the Z/ARCHITECTURE and to execute software and instructions developed based on the Z/ARCHITECTURE.

Figure 13B:
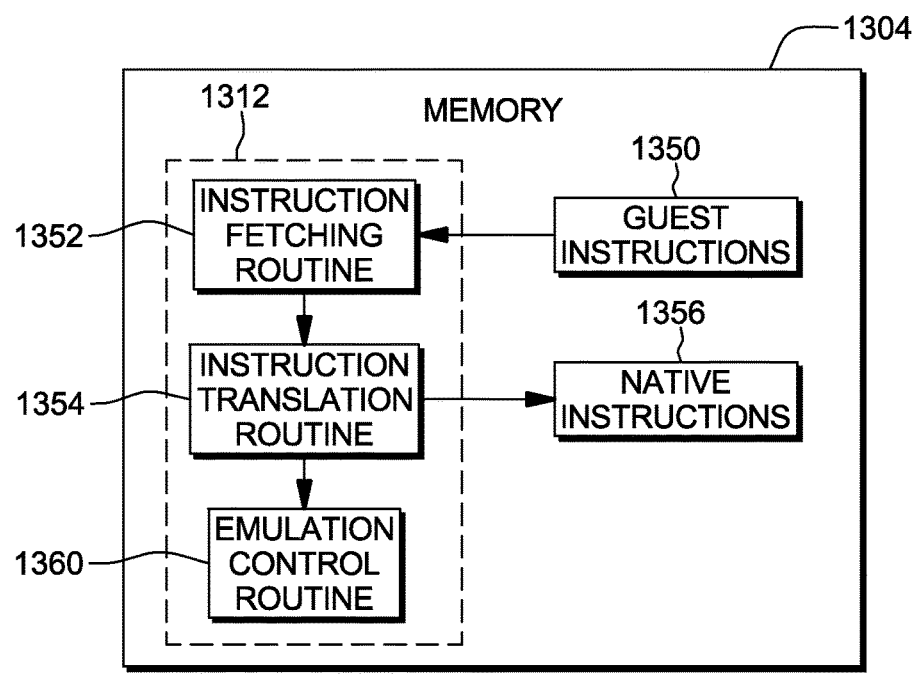
FIG. 13B depicts further details of the memory of FIG. 13A.

Further details relating to emulator code 1312 are described with reference to FIG. 13B. Guest instructions 1350 stored in memory 1304 comprise software instructions (e.g., correlating to machine instructions) that were developed to be executed in an architecture other than that of native CPU 1302. For example, guest instructions 1350 may have been designed to execute on a Z/ARCHITECTURE processor 1202, but instead, are being emulated on native CPU 1302, which may be, for example, an INTEL Itanium II processor. In one example, emulator code 1312 includes an instruction fetching routine 1352 to obtain one or more guest instructions 1350 from memory 1304, and to optionally provide local buffering for the instructions obtained. It also includes an instruction translation routine 1354 to determine the type of guest instruction that has been obtained and to translate the guest instruction into one or more corresponding native instructions 1356. This translation includes, for instance, identifying the function to be performed by the guest instruction and choosing the native instruction(s) to perform that function.

Further, emulator 1312 includes an emulation control routine 1360 to cause the native instructions to be executed. Emulation control routine 1360 may cause native CPU 1302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 1356 may include loading data into a register from memory 1304; storing data back to memory from a register; or performing some type of arithmetic or logic operation, as determined by the translation routine.

Each routine is, for instance, implemented in software, which is stored in memory and executed by native central processing unit 1302. In other examples, one or more of the routines or operations are implemented in firmware, hardware, software or some combination thereof. The registers of the emulated processor may be emulated using registers 1310 of the native CPU or by using locations in memory 1304. In embodiments, guest instructions 1350, native instructions 1356 and emulator code 1312 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Described in detail herein is a capability for predicting the performance of a communications network, such as a multistage network under load from multiple communicating servers. In one embodiment, the prediction is performed without running an experiment on the actual network. The capability uses, for instance, the topology information assumed in the network to be evaluated, the routing information produced by, e.g., routing software for that topology, and a specified set of communicating servers in the system to predict an amount of bandwidth that each of the servers sees, as well as the total amount of bandwidth seen by all of the servers, when the servers try to communicate at once.

The complex interaction of the messages simultaneously in flight in the network does not readily lend itself to interference predictions in large systems to allow appropriate experimentation of techniques for route generation or topology choices. However, in accordance with one or more aspects, results are provided that allow both topology changes and route generation techniques to be evaluated without requiring the actual network to be used for the experiments.

For large scale networks (e.g., thousands of servers), it is not practical to run low level cycle simulations to determine the performance; and thus, a higher level view of the interference impacts is needed. Traditionally, routing information was examined to determine the contention characteristics on the cables in the network. The link with the highest contention for each server was then used as the estimate of the resulting performance. This technique, however, does not take into account the typical case in a large system where a route uses multiple cables that are shared, and is therefore, too optimistic in its estimate and does not provide the required level of interference information. Thus, in one aspect, a capability is provided that accounts for multiple shared resources with the sharing nodes possibly being different on each cable.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 14:
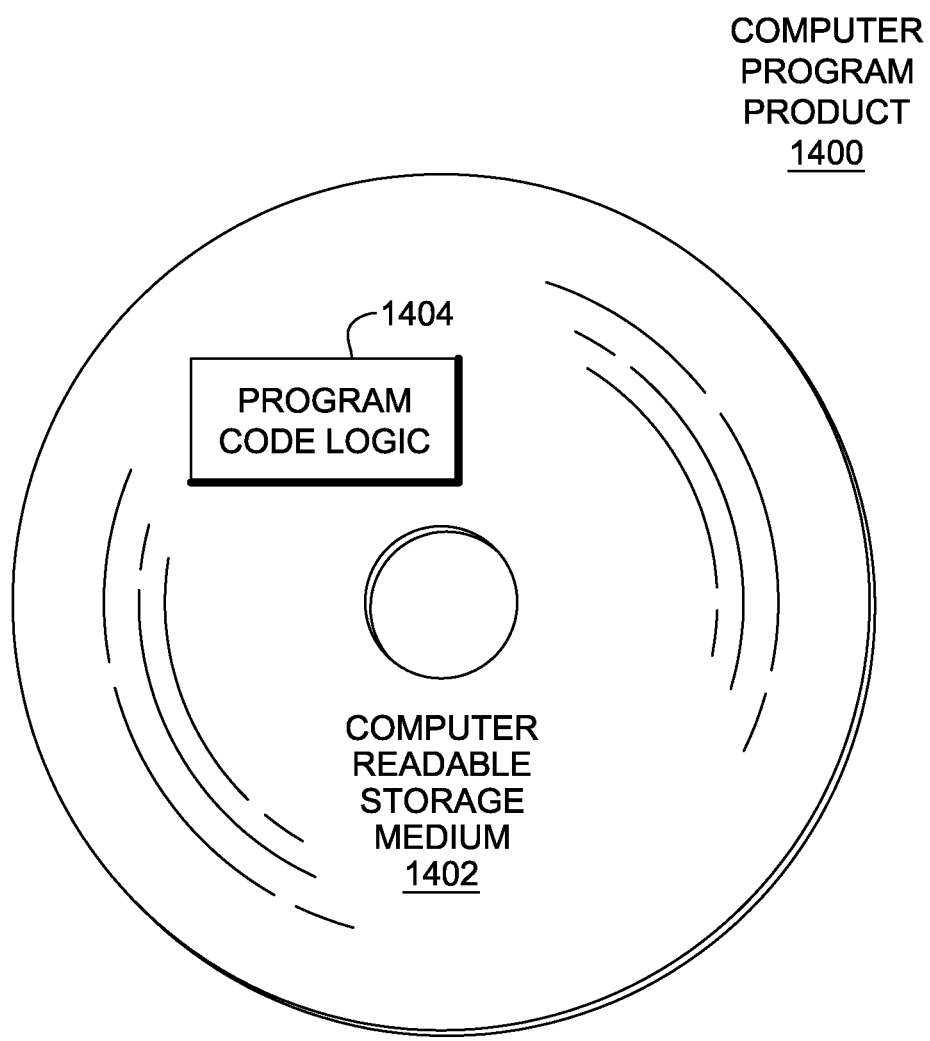
FIG. 14 depicts one embodiment of a computer program product incorporating one or more aspects.

Referring now to FIG. 14, in one example, a computer program product 1400 includes, for instance, one or more non-transitory computer readable storage media 1402 to store computer readable program code means or logic 1404 thereon to provide and facilitate one or more aspects of the present invention.

Program code embodied on a computer readable medium may be transmitted using an appropriate medium, including but not limited to, wireless, wireline, optical fiber cable, RF, etc., or any suitable combination of the foregoing.

Computer program code for carrying out operations for aspects of the present invention may be written in any combination of one or more programming languages, including an object oriented programming language, such as JAVA, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects. As one example, the deploying of an application comprises providing computer infrastructure operable to perform one or more aspects of the present invention.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Although various embodiments are described above, these are only examples. For example, computing environments of other architectures can incorporate and use one or more aspects of the present invention. Additionally, other communications networks may be simulated and/or other extensions may be provided. Communications networks differing in size and/or number of stages than described herein may be analyzed. Many variations are possible without departing from one or more aspects.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of one or more aspects has been presented for purposes of illustration and description, but is not intended to be exhaustive or limited to the invention in the form disclosed. Many modifications and variations will be apparent to those of ordinary skill in the art without departing from the scope and spirit of one or more aspects. The embodiment was chosen and described in order to best explain the principles of the one or more aspects and the practical application, and to enable others of ordinary skill in the art to understand the one or more aspects for various embodiments with various modifications as are suited to the particular use contemplated.

What is claimed is:

1. A computer program product for optimizing an actual routing configuration of a communications network, the computer program product comprising:
a non-transitory storage medium readable by a processing circuit and storing instructions for execution by the processing circuit for performing a method, the method comprising:
predicting, using a first routing configuration of the communications network, a first performance of a server in the communications network, the predicting comprising:
determining, by one or more processors, an aggregate communications load for the server of the communications network, wherein the aggregate communications load is based on a plurality of link loads for a plurality of links to be used by the server after the first routing configuration is implemented;
based on the aggregate communications load, normalizing, by the one or more processors, the plurality of link loads to obtain a plurality of normalized link loads, wherein the normalizing comprises:
for each link of the plurality of links of the server:
determining whether the link is used by one or more other servers of the communications network;
based on the determining indicating that the link is not used by the one or more other servers, using a bandwidth reduction factor for the server as an updated link load for the link;
based on the determining indicating that the link is used by one or more other servers, computing the updated link load for the link, the computing adding the bandwidth reduction factor for the server to one or more other bandwidth reduction factors of one or more other servers to use the link; and
taking a reciprocal of the updated link load to provide a normalized link load for the link; and
using the plurality of normalized link loads, determining, by the one or more processors, a server bandwidth for the server, the server bandwidth providing the first performance of the server;
predicting, using a second routing configuration of the communications network, a second performance of the server in the communications network;
comparing, by the one or more processors, the first performance of the server to the second performance of the server; and
optimizing, by the one or more processors, the actual routing configuration of the communications network by implementing the first routing configuration or the second routing configuration, based on the comparing.

2. The computer program product of claim 1, wherein the determining the aggregate communications load for the server includes:
obtaining the plurality of link loads; and
multiplying the plurality of link loads to obtain a result, the result being the aggregate communications load.

3. The computer program product of claim 2, wherein the method further comprises:
determining, by the one or more processors, the bandwidth reduction factor for the server; and
using, by the one or more processors, the bandwidth reduction factor in normalizing the plurality of link loads.

4. The computer program product of claim 3, wherein the determining the bandwidth reduction factor comprises:
taking a reciprocal of the result to obtain the bandwidth reduction factor for the server.

5. The computer program product of claim 1, wherein the determining the server bandwidth for the server comprises:
determining, by the one or more processors, a plurality of link bandwidths for the plurality of links to be used by the server, the determining the plurality of link bandwidths comprising using the bandwidth reduction factor for the server and the normalized link loads for the plurality of links; and selecting, by the one or more processors, from the plurality of link bandwidths a link bandwidth to be used as the server bandwidth.

6. The computer program product of claim 5, wherein the selecting from the plurality of link bandwidths comprises:
determining from the plurality of link bandwidths a link bandwidth having a smallest value from among the plurality of link bandwidths; and
choosing that link bandwidth as the server bandwidth.

7. The computer program product of claim 5, wherein the determining the plurality of link bandwidths comprises:
selecting a link of the plurality of links of the server;
multiplying the bandwidth reduction factor for the server with the normalized link load for the selected link to obtain the link bandwidth for the link; and
repeating the selecting a link and the multiplying the bandwidth reduction factor for one or more other links of the plurality of links.

8. The computer program product of claim 1, wherein the method further comprises repeating the determining the aggregate communications load, normalizing the plurality of link loads, and determining the server bandwidth for one or more other servers of the communications network.

9. The computer program product of claim 1, wherein the server bandwidth comprises a minimum link bandwidth of the server.

10. A computer system for optimizing an actual routing configuration of a communications network, the computer system comprising:
a memory; and
one or more processors in communications with the memory, wherein the computer system is configured to perform a method, the method comprising:
predicting, using a first routing configuration of the communications network, a first performance of a server in the communications network, the predicting comprising:
determining, by one or more processors, an aggregate communications load for the server of the communications network, wherein the aggregate communications load is based on a plurality of link loads for a plurality of links to be used by the server after the first routing configuration is implemented;
based on the aggregate communications load, normalizing, by the one or more processors, the plurality of link loads to obtain a plurality of normalized link loads, wherein the normalizing comprises:
for each link of the plurality of links of the server:
determining whether the link is used by one or more other servers of the communications network;
based on the determining indicating that the link is not used by the one or more other servers, using a bandwidth reduction factor for the server as an updated link load for the link;
based on the determining indicating that the link is used by one or more other servers, computing the updated link load for the link, the computing adding the bandwidth reduction factor for the server to one or more other bandwidth reduction factors of one or more other servers to use the link; and
taking a reciprocal of the updated link load to provide a normalized link load for the link; and using the plurality of normalized link loads, determining, by the one or more processors, a server bandwidth for the server, the server bandwidth providing the first performance of the server;
predicting, using a second routing configuration of the communications network, a second performance of the server in the communications network;
comparing, by the one or more processors, the first performance of the server to the second performance of the server; and
optimizing, by the one or more processors, the actual routing configuration of the communications network by implementing the first routing configuration or the second routing configuration, based on the comparing.

11. The computer system of claim 10, wherein the determining the aggregate communications load for the server includes:
obtaining the plurality of link loads; and
multiplying the plurality of link loads to obtain a result, the result being the aggregate communications load.

12. The computer system of claim 11, wherein the method further comprises:
determining, by one or more processors, the bandwidth reduction factor for the server; and
using, by the one or more processors, the bandwidth reduction factor in normalizing the plurality of link loads.

13. The computer system of claim 12, wherein the determining the bandwidth reduction factor comprises:
taking a reciprocal of the result to obtain the bandwidth reduction factor for the server.

14. The computer system of claim 10, wherein the determining the server bandwidth for the server comprises:
determining, by the one or more processors, a plurality of link bandwidths for the plurality of links to be used by the server, the determining the plurality of link bandwidths comprising using the bandwidth reduction factor for the server and the normalized link loads for the plurality of links; and
selecting from the plurality of link bandwidths a link bandwidth to be used as the server bandwidth.

15. The computer system of claim 14, wherein the selecting from the plurality of link bandwidths comprises:
determining from the plurality of link bandwidths a link bandwidth having a smallest value from among the plurality of link bandwidths; and
choosing that link bandwidth as the server bandwidth.

16. The computer system of claim 14, wherein the determining the plurality of link bandwidths comprises:
selecting a link of the plurality of links of the server;
multiplying the bandwidth reduction factor for the server with the normalized link load for the selected link to obtain the link bandwidth for the link; and
repeating the selecting a link and the multiplying the bandwidth reduction factor for one or more other links of the plurality of links.

17. The computer system of claim 10, wherein the method further comprises repeating the determining the aggregate communications load, normalizing the plurality of link loads, and determining the server bandwidth for one or more other servers of the communications network.

18. The computer system of claim 10, wherein the server bandwidth comprises a minimum link bandwidth of the server.

* * * * *